United States Patent [19]

Roha

[11] Patent Number: 4,714,567
[45] Date of Patent: Dec. 22, 1987

[54] REACTING ALUMINA HYDRATE SOL AND AN ORGANIC MATERIAL TO FORM A STABLE MONOLITHIC GEL

[75] Inventor: Max E. Roha, Brecksville, Ohio

[73] Assignee: Aluminum Company of America, Pittsburgh, Pa.

[21] Appl. No.: 793,281

[22] Filed: Oct. 31, 1985

[51] Int. Cl.$^4$ ............................................. B01J 13/00
[52] U.S. Cl. ........................... 252/315.2; 106/287.17; 252/315.4; 252/315.7; 501/12; 502/150; 502/159
[58] Field of Search ............... 252/315.2, 315.4, 315.7; 423/630; 501/12; 106/287.17; 502/150, 159

[56] References Cited

U.S. PATENT DOCUMENTS

| | | | |
|---|---|---|---|
| 3,030,233 | 4/1962 | Koenecke et al. | 106/287.17 X |
| 3,152,865 | 10/1964 | Koch | 23/143 |
| 3,174,930 | 3/1965 | Damerell | 252/315.7 X |
| 3,322,494 | 5/1967 | Magee et al. | 23/143 |
| 3,325,247 | 6/1967 | Magee et al. | 23/143 |
| 3,352,635 | 11/1967 | Machin et al. | 423/630 X |
| 3,361,526 | 1/1968 | Magee et al. | 23/143 |
| 3,417,028 | 12/1968 | Montgomery et al. | 252/317 |
| 3,944,658 | 3/1976 | Yoldas | 423/630 X |
| 3,993,590 | 11/1976 | André et al. | 502/159 X |
| 4,024,231 | 5/1977 | Ziegenhain | 423/630 X |
| 4,215,015 | 7/1980 | Tu | 252/453 |

*Primary Examiner*—Richard D. Lovering
*Attorney, Agent, or Firm*—Glenn E. Klepac

[57] ABSTRACT

A stable monolithic gel produced by reacting an alumina hydrate sol with an organic reactant selected from the group consisting of polycarboxylic acids having esterified acid groups, anhydrides of polycarboxylic acids, and water-soluble cationic or neutral polyacrylamides. A particularly preferred gel is made by reacting an alumina monohydrate sol with dimethyl oxalate. The preferred monolithic gel remains transparent or slightly cloudy upon storage with little syneresis.

16 Claims, No Drawings

REACTING ALUMINA HYDRATE SOL AND AN ORGANIC MATERIAL TO FORM A STABLE MONOLITHIC GEL

BACKGROUND OF THE INVENTION

The present invention relates to aluminous gels and to methods for their preparation.

Gels comprising alumina hydrate combined with various organic compounds are known in the prior art. However, such gels generally take the form of a white floc rather than a stable clear gel.

For example, in Tu U.S. Pat. No. 4,215,015 anionic polyacrylamide is added to a silica-alumina slurry gel. The polyacrylamide is said to react chemically with the silica-alumina gel framework, thereby contributing to pore structure of inorganic oxide material formed by drying and calcining the gel.

Several other references also disclose addition of various organic polymers to solutions in which hydrous gels are precipitated. Montgomery et al U.S. Pat. No. 3,417,028 claims addition to gels of polyvinyl alcohol, polyethylene glycols, polyethylene oxides, methyl celluloses, and polyacrylamides. Disclosures of other organic additives are contained in Magee et al U.S. Pat. Nos. 3,322,494; 3,325,247 and 3,361,526.

Koch et al U.S. Pat. No. 3,152,865 discloses a process for stabilizing alumina gel wherein a chelating organic component of 2–10 carbon atoms containing two or more carboxyl groups is added to an aluminum chloride solution to form a slurry from which alumina monohydrate gel is precipitated. Two suitable chelating agents are oxalic acid and tartaric acid. Addition of the chelating agent is claimed to stabilize the alumina monohydrate against conversion to other hydrate forms of alumina.

Although the references summarized above each use the term "gel," reaction conditions described therein are believed to result in formation of white flocs rather than transparent, stable monolithic gels.

As used herein, the term "monolithic gel" refers to a gelled mass characterized by substantially no separation of a liquid phase. The term "floc" refers to a combination or aggregation of suspended particles in such a way that they form small clumps or tufts. A monolithic gel made in accordance with the present invention is generally transparent or slightly opalescent whereas an alumina hydrate floc is generally white. The term "gel" is often used in the prior art to describe what is called a floc herein.

The expression "alumina hydrate" refers to $Al_2O_3 \cdot x\, H_2O$, where x varies from 1 to 3. In other words, the water of the alumina hydrate varies from 15.0 to 34.6 percent by weight of the alumina hydrate, determined by calcination at 538° C. (1000° F.) for one hour.

It is a principal objective of the present invention to provide a method for preparing a stable monolithic gel comprising alumina hydrate combined with an organic material.

A related objective of the invention is to provide a novel, stable monolithic gel comprising alumina hydrate combined with an organic material.

Additional objects and advantages of the present invention will become apparent to persons skilled in the art from the following specification and claims.

SUMMARY OF THE INVENTION

In accordance with the present invention, alumina hydrate is combined with an organic material to form a stable monolithic gel. The gel is produced by a method comprising the steps of
(a) preparing a sol comprising a colloidal dispersion of alumina hydrate in an aqueous solution,
(b) mixing said sol and an organic reactant, and
(c) reacting the alumina hydrate with the organic reactant to form a gel.

The organic reactant is selected from the group consisting of polycarboxylic acids having esterified acid groups, anhydrides of polycarboxylic acids and water-soluble cationic or neutral polyacrylamides. The polycarboxylic acid esters and anhydrides are preferably soluble in water or in water-alcohol mixtures.

The alumina hydrate sol is preferably prepared by hydrolyzing an aluminum alkoxide in an aqueous acidic solution. A preferred aluminum alkoxide is aluminum secondary-butoxide.

The organic reactant may comprise a water-soluble diester of an aliphatic dicarboxylic acid containing about 2–6 carbon atoms. Water-soluble diesters of oxalic acid, malonic acid, tartaric acid, and succinic acid are preferred. Dimethyl oxalate is particularly suitable. The dimethyl oxalate is dissolved in water, methanol or ethanol prior to reaction with the alumina sol. A methanol solution was employed in several preferred examples so that the dimethyl oxalate would not hydrolyze to oxalic acid before reacting with the sol.

The organic reactant and alumina hydrate sol are preferably reacted at an elevated temperature of about 50°–100° C. A reaction temperature of about 80° C. is particularly preferred. The reaction is preferably carried out in an aqueous solution having a pH of less than about 7. The reaction forms a monolithic gel over a wide range of concentrations of the organic reactant and alumina hydrate sol.

If desired, polyvinyl alcohol or other water-soluble alcohol may be added to the reaction solution in order to adjust its viscosity.

A preferred monolithic gel made in accordance with the invention is nearly transparent with slight cloudiness. At room temperature, the gel retains its appearance with no syneresis for several weeks. Heating the gel to 80° C. results in shrinkage to a more dense monolithic structure with concurrent syneresis and formation of an aqueous phase. The alumina hydrate and organic groups in this gel are believed to be combined by covalent or weakly ionic bonding.

The monolithic gel of the invention is useful as a surface coating. The gel may also be dried and calcined to form a catalyst base.

DETAILED DESCRIPTION OF A PREFERRED EMBODIMENT

The preferred method and gel of the invention are described herein with reference to several preferred examples.

EXAMPLE 1

An aqueous alumina hydrate sol was prepared by placing 123.1 g (0.5 moles) of aluminum secondary-butoxide in a 2 liter round bottom flask. An aqueous solution comprising 50 ml of 7 wt % acetic acid in 900 ml water was added to the alumina sol. The mixture was heated with stirring to 80° C. and held for 16 hours.

After cooling to room temperature, the slightly cloudy alumina hydrate sol was decanted and stored for subsequent studies.

EXAMPLE 2

A solution comprising 0.9 g of 6 wt % dimethyl oxalate in methanol was added to 20 g of the alumina sol prepared in Example 1. No floc or precipitate formed. The solution was then heated to 80° C. The solution was converted to a monolithic gel in 23 minutes.

Using 3.6 g of the dimethyl oxalate solution produced a monolithic gel in 6 minutes at 80° C. Additional heating for a total of 32 minutes resulted in shrinkage of the gel to a more dense monolithic structure with concurrent syneresis and formation of an aqueous phase. Density of the gel varied depending upon amounts of reactants used.

EXAMPLE 3

A comparative test was performed by adding 0.5 g of 7 wt % aqueous oxalic acid solution to 20 g of the alumina sol prepared in Example 1. In contrast with Example 2, a clumpy, gelatinous floc was produced immediately upon mixing. Subsequent heating at 80° C. resulted in only partial dispersion to a gel. This test demonstrates that significant proportions of free carboxyl groups interfere with the orderly formation of a clear, monolithic gel product.

EXAMPLE 4

Addition of 1.0 g of 10 wt % solution of cationic polyacrylamide sold by Dow Chemical Co. under the trade name Purifloc C31 to 20 g of the Example 1 alumina sol produced a clear solution without formation of a floc or gel. However, heating the solution to 80° C. caused the entire solution to produce a firm, monolithic gel without floc formation. Similarly, a neutral polyacrylamide containing only minor amounts of free carboxyl functions (Cyanamer P250 marketed by American Cyanamid Co.) gave comparable results with only minor floc formation.

On the other hand, anionic polyacrylamide (Separan 87D marketed by Dow Chemical Co.) reacted with the alumina sol and produced an immediate gelatinous floc upon mixing. The floc settled leaving a clear supernatant solution. Heating to 80° C. failed to significantly change the product. This test demonstrates the inability of anionic polymers containing free carboxyl groups to form clear, monolithic gels.

EXAMPLE 5

A concentrated alumina sol was prepared by heating the Example 1 sol to 80° C. with slow removal of water by vaporization. When the sol had been concentrated to 40% of its initial volume, it had become more viscous and remained clear and ungelled. No floc was produced.

EXAMPLE 6

The concentrated sol prepared in Example 5 was mixed with a solution of dimethyl oxalate in methanol in the same molar proportions used in Example 2. There was no apparent change in viscosity of the sol. Upon heating to 80° C. for 8 minutes, the entire mass formed a monolithic gel without formation of any floc or precipitate.

Repeating Example 4 using the concentrated sol and the cationic and neutral polyacrylamide also produced no apparent changes until heated to 80° C. when the entire mass again formed a monolithic gel without any floc or precipitate.

EXAMPLE 7

Twenty grams of the sol prepared according to Example 1 were diluted with an additional 20 g of water. One gram of 6 wt % dimethyl oxalate in methanol was added to the solution and the mixture was heated to 80° C. A clear, monolithic gel formed in 31 minutes.

When the sol was diluted with 20 g of methanol, a monolithic gel was also produced in 31 minutes after addition of one gram of the dimethyl oxalate solution. Using only 0.5 g of the dimethyl oxalate solution required 37 minutes for gelation to occur.

EXAMPLE 8

One gram of a freshly prepared 5 wt % solution of maleic anhydride in water was mixed with 21 g of the sol prepared in Example 1. The mixture was clear and showed no floc or gelation. During heating overnight at 76° C., a clear monolithic gel was formed. Using 2 g of the maleic anhydride solution, gelation occurred overnight at both 76° C. and at room temperature. Additional heating did not change any of the gels formed in this Example.

The foregoing detailed description of my invention has been made with reference to several preferred examples. Persons skilled in the art will understand that numerous changes and modifications can be made therein without departing from the spirit and scope of the following claims.

What is claimed is:

1. A method for preparing a stable monolithic gel comprising alumina hydrate combined with an organic material, said method comprising
    (a) preparing a sol comprising a colloidal dispersion of alumina hydrate in an aqueous solution,
    (b) mixing said sol and an organic reactant selected from the group consisting of polycarboxylic acids having esterified acid groups and anhydrides of polycarboxylic acids, and
    (c) reacting said alumina hydrate with said organic reactant, thereby to form a monolithic gel comprising alumina hydrate chemically combined with an organic material.

2. A method as claimed in claim 1 wherein said sol comprises a colloidal dispersion of alumina monohydrate.

3. A method as claimed in claim 2 wherein step (c) comprises heating said alumina monohydrate and said organic reactant to an elevated temperature of about 50°–100° C.

4. A method as claimed in claim 1 wherein step (a) includes hydrolyzing an aluminum alkoxide in an aqueous acidic solution to form a sol comprising a colloidal dispersion of alumina monohydrate in an aqueous acidic solution.

5. A method as claimed in claim 1 wherein said organic reactant comprises a water-soluble diester of an aliphatic dicarboxylic acid containing about 2–6 carbon atoms.

6. A method as claimed in claim 1 wherein said organic reactant comprises a water-soluble diester of oxalic acid, malonic acid, tartaric acid or succinic acid.

7. A method as claimed in claim 1 wherein said organic reactant comprises dimethyl oxalate.

8. A method as claimed in claim 7 wherein the dimethyl oxalate is dissolved in methanol or ethanol or water prior to step (b).

9. A method as claimed in claim 1 wherein said organic reactant is a water-soluble anhydride of a polycarboxylic acid.

10. A method as claimed in claim 1 wherein said organic reactant is maleic anhydride.

11. A method as claimed in claim 1 wherein step (C) is performed in an aqueous solution having a pH of less than about 7.

12. A generally transparent or slightly opalescent monolithic gel produced by the method of claim 1.

13. The gel of claim 12 produced by
   (a) preparing a sol comprising a colloidal dispersion of alumina monohydrate in an aqueous acidic solution,
   (b) mixing said sol and an organic reactant comprising a water-soluble diester of oxalic acid, and
   (c) reacting said alumina monohydrate and said organic reactant at an elevated temperature of about 50°–100° C. in an aqueous solution.

14. A method for preparing a stable monolithic gel comprising alumina hydrate combined with an organic material, said method comprising
   (a) preparing a sol comprising a colloidal dispersion of alumina hydrate in an aqueous solution,
   (b) mixing said sol and an organic reactant comprising a water-soluble cationic or neutral polyacrylamide, and
   (c) reacting said alumina hydrate with said organic reactant in an aqueous solution having a pH of less than about 7, thereby to form a monolithic gel comprising alumina hydrate chemically combined with an organic material.

15. A method as claimed in claim 14 wherein said organic reactant is a cationic polyacrylamide.

16. A method as claimed in claim 14 wherein step (c) comprises heating said alumina hydrate and said organic reactant to an elevated temperature of about 50°–100° C.

* * * * *